(No Model.)

J. COMSTOCK & T. E. JEFFERSON.
METHOD OF VENTILATION.

No. 259,631.

Patented June 13, 1882.

WITNESSES
F. H. Knight
W. H. H. Knight

INVENTORS
John Comstock
Thomas E. Jefferson (No Model.) 9 Sheets—Sheet 4.

J. COMSTOCK & T. E. JEFFERSON.
METHOD OF VENTILATION.

No. 259,631. Patented June 13, 1882.

WITNESSES
F. H. Knight
W. H. N. Knight

INVENTORS
John Comstock
Thomas E. Jefferson (No Model.) 9 Sheets—Sheet 5.

J. COMSTOCK & T. E. JEFFERSON.
METHOD OF VENTILATION.

No. 259,631. Patented June 13, 1882.

WITNESSES
F. H. Knight
W. H. H. Knight

INVENTORS
John Comstock
Thomas E. Jefferson (No Model.) 9 Sheets—Sheet 6.

J. COMSTOCK & T. E. JEFFERSON.
METHOD OF VENTILATION.

No. 259,631. Patented June 13, 1882.

WITNESSES
F. H. Knight
W. H. H. Knight

INVENTORS
John Comstock
Thomas E. Jefferson

N. PETERS, Photo-Lithographer, Washington, D. C.

(No Model.) 9 Sheets—Sheet 7.

J. COMSTOCK & T. E. JEFFERSON.
METHOD OF VENTILATION.

No. 259,631. Patented June 13, 1882.

WITNESSES
F. H. Knight
W. H. H. Knight

INVENTORS
John Comstock
Thomas E. Jefferson (No Model.) 9 Sheets—Sheet 9.

J. COMSTOCK & T. E. JEFFERSON.
METHOD OF VENTILATION.

No. 259,631. Patented June 13, 1882.

United States Patent Office.

JOHN COMSTOCK, OF HUDSON, WISCONSIN, AND THOMAS E. JEFFERSON, OF BOSTON, MASSACHUSETTS.

METHOD OF VENTILATION.

SPECIFICATION forming part of Letters Patent No. 259,631, dated June 13, 1882.

Application filed March 29, 1882. (No model.)

*To all whom it may concern:*

Be it known that we, JOHN COMSTOCK, of Hudson, St. Croix county, Wisconsin, and THOMAS E. JEFFERSON, of Boston, Massachusetts, citizens of the United States, have invented a certain new and Improved Method of Ventilation, of which the following is a specification, reference being had therein to the accompanying drawings.

Our invention has for its object to provide a practical, economical, and efficient system of ventilation for a district or entire city, including any or all streets, alleys, and public buildings, and any or all shops, stores, factories, and other places of business, and the dwellings of rich and poor alike, without distinction, said system being designed not only to accelerate the carrying off of the ordinary sewage of a city, thereby increasing the capacity of a sewer and preventing the extensive generation of sewage-gas, but to conduct to a point remote from the dwellings and working-places of the inhabitants the air which has been vitiated, and also not only to render the atmosphere throughout the city pure and wholesome by the removal of the smoke, soot, gases, and the like arising from the combustion of fuel and the manipulation of various substances in the arts and manufactures, but also to utilize the carbon therein contained as a deodorizer and disinfectant to the sewage-gas by bringing them in contact within the sewer, and to utilize the surplus heat in the same manner to prevent the freezing of the sewage in severe weather.

It will also be observed that the inhabitants of a city or town suffer most when the atmosphere is still and the weather sultry, and that by this invention at such times the householder or janitor can, at his will and convenience, not only create a draft and circulation of air in his dwelling or other building, but that he can control and modify the same as occasion may require.

Having thus stated in a general way the objects and scope of the invention, we will now detail more specifically the results to be accomplished by it, and explain the means and instrumentalities employed in carrying it into practical use.

In the first place our invention contemplates a system of complete ventilation for a city, involving the use of approximately air-tight mains or conduits having various branches threading the several streets, and suitable connections leading from the said mains or their branches into the dwelling-houses, factories, or other buildings or places to be ventilated, and provided with suitable connections from the several rooms or apartments of said houses, &c., for the outflow of the vitiated atmosphere from said apartments, &c., and an air-exhausting apparatus, preferably located at or near the discharge end or ends of the mains or sewers, for creating a powerful suction or partial vacuum in such mains or sewers, and thus drawing the vitiated air from the said buildings and other places to be ventilated throughout the city and discharge it at remote points. The mains or conduits employed in this system may consist of the same mains or conduits that convey away the sewage of the city; or they may consist of independent mains, or mains auxiliary to the sewer-mains.

We employ suitable outwardly-opening check-valves in the air-passages leading from the several apartments or places to be ventilated, in order to prevent, by any possibility, a back flow from the mains into the houses or other places, and we also provide efficient and suitable means for regulating the discharge into said exit-passages at will.

The mains and conduits which are employed as agencies in our scheme of general ventilation are made approximately or sufficiently air-tight to enable a partial vacuum to be formed therein, as hereinbefore indicated, and proper traps and seals are provided for the uninterrupted passage of water and ordinary drainage and sewage in one direction into the mains or conduits from the surface of the streets, and from the houses, factories, and other places where sewage emanates. By this means the apartments are ventilated into the stove or furnace, the latter into the sewer, and the sewer into the open air by the air-current induced within the sewer.

We may here state that we preferably combine the ventilating system with the sewage system, first, because the cost of introducing the combined system is but little more than that of introducing an ordinary sewage system alone, and, secondly, because the mode of ventilating can be carried out by means of sewage systems already introduced and in operation. In this system of ventilation it is obvious that the strong suction and current of air and commingled gases thus constantly rushing through the mains toward the point of discharge will, by acting upon the sewage, greatly accelerate the flow of the latter through the mains, and thus largely increase the capacity of the sewer, besides removing temporary obstructions in the sewer and materially reducing the liability of clogging and choking up of the same. The heated air, smoke, gases, and other products of combustion and steam drawn into the sewer tend to preserve a temperature in the sewer sufficiently high to prevent the formation of ice or the accumulation of ice and snow therein, or the deleterious action of frost, and by heating and expanding the gases increase their volatility, and they are thus more easily moved and carried off by the suction. The heated air, smoke, and other products of combustion drawn into the sewer act as powerful deodorizers and disinfectants, and tend to render harmless the noxious gases therein, and the large amount of but partly-vitiated atmospheric air drawn in from the sources to be ventilated operates to greatly dilute and neutralize said gases. All water-closets, house-drains, bath-rooms, sinks, cesspools, cellars, &c., can be ventilated directly into the sewer, thus converting all those channels leading thereto into avenues of purification. These and other considerations recommend the sewer, where such is in operation, as the most economical means for carrying out our system of ventilation.

Our invention also contemplates the discharge of the volume of gases, air, and vapor from the sewer at or near its discharge end, either through a furnace or through a gas-washer of any ordinary or suitable construction, or through a tall chimney into the open air, or simply directly into the open air at the point of discharge, or otherwise.

In our method of ventilation our invention contemplates also the provision of a hood, valve, or guard at or near the discharge end of the sewer, arranged so as to permit the outflow of the liquid or semi-liquid contents of the sewer and prevent an inward flow of air, which might interfere with the proper operation of the suction apparatus. Our invention, then, as a basis, contemplates the production of a constantly-existing draft in one direction, which draft shall be connected with any or all apartments, stoves, furnaces, cellars, &c., or other place which it is desired to ventilate.

The carbonic-acid gas which results from nature's effort to throw off decay, instead of being again thrown into circulation through the lungs, is separated not only from the party who emits it, but also from his neighbors, and it is conveyed quickly and directly away from the lungs of humanity and purified. Instead of ventilating our impure air into the street, where the public must meet it, or into the domain of our neighbor, we propose to get rid of its evil influence entirely by eliminating it through the sewer or other main and conveying it away. The importance of this result upon a sleeping city, when the sluggish and heavy night air holds the said gas and poisonous vapors close to the earth to be inhaled again and again, will be appreciated if facts are properly observed. If this is true of that peculiar source of disease, it is equally so of others. Hence we propose to not only eliminate the gases as fast as generated, but to prevent their stagnation and multiplication by our system of continual action and draft, which will induce into their places an atmosphere properly proportioned with the oxygen of life. This system of ventilation allows the germs of contagion from the lungs, pores, or pustules of the sick in variola, scarlatina, &c., to be carried away from the contact with the other persons in the immediate vicinity, thus preventing the spread of the plague. In fact, with such a sufficient ventilation as is possible under this system, a contagious disease could be treated in one apartment without exposing the occupants of the adjacent one.

The invention is illustrated in the accompanying drawings, in which.

16 and 17 are views showing the utilization of the drawn-off heated volatile products of combustion from the fires of stoves, furnaces, &c., as a means for the purification and heating of the sewer and drains.

Figure 1:
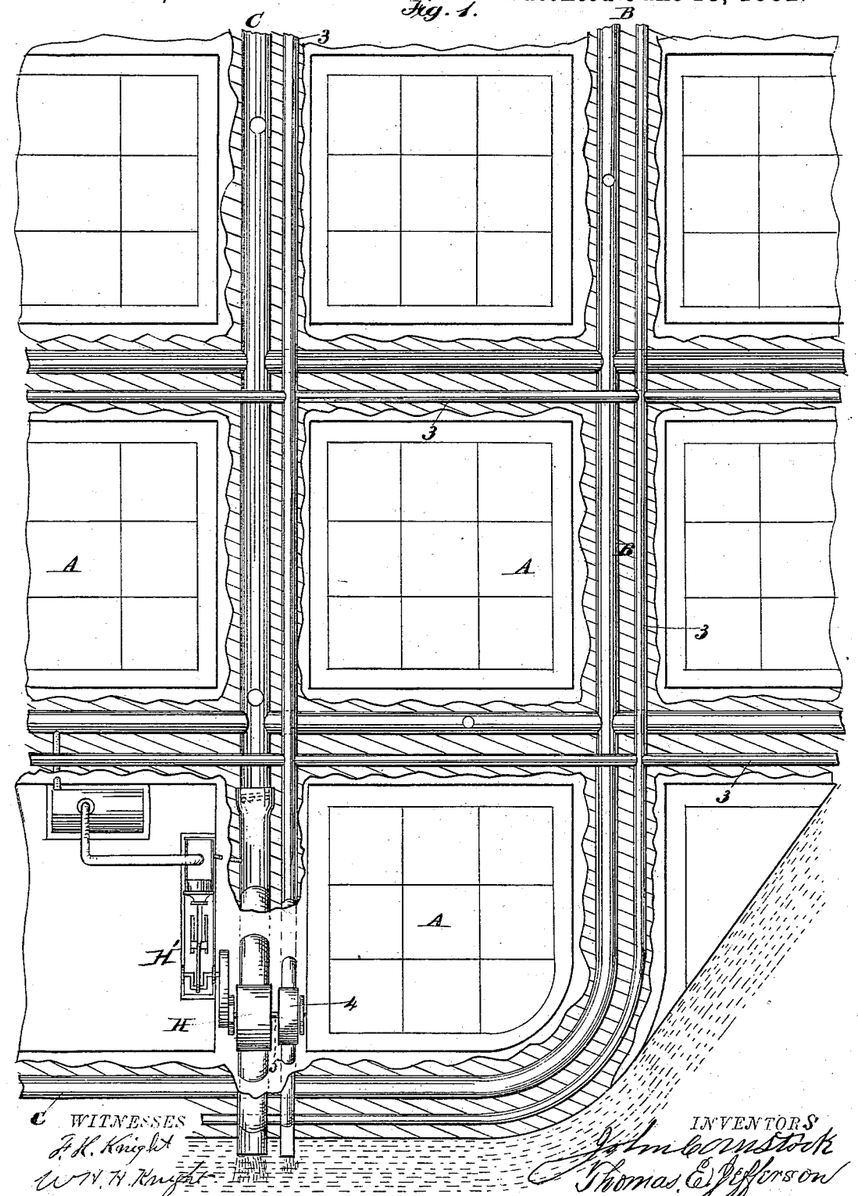
Figure 1 represents a plan view of a portion of a city provided with our improved system of ventilation.

A represents the squares comprising a portion of a city, and B the streets thereof, in which are laid a system of sewer-mains, C, of the ordinary or any preferred construction. These mains are provided with proper sealed traps D for the admission of drainage from the surface of the streets, and with branch pipes E and connecting-pipes G, leading into the several houses and other places along the streets to be drained and ventilated, as shown in Fig. 2.

Figures 13, 15:
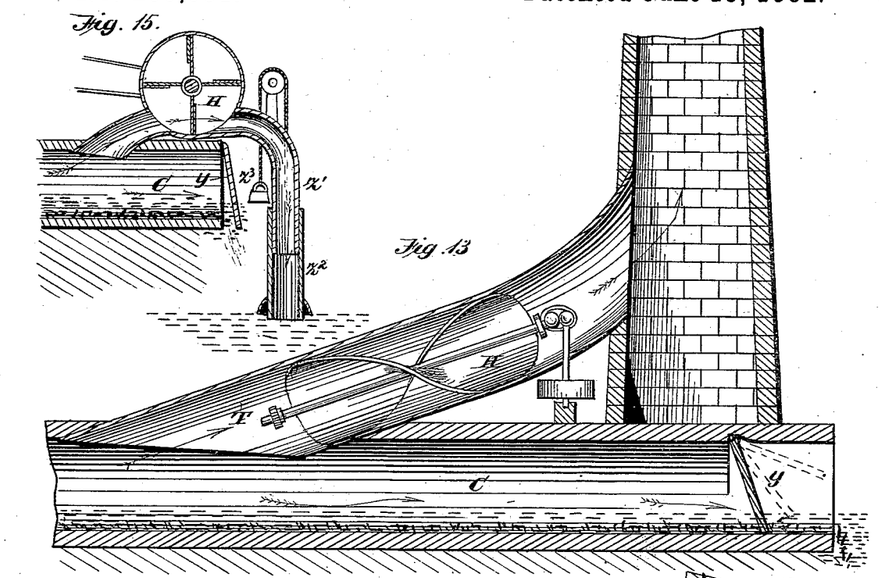
Figs. 13 and 14 represent different forms of suction apparatus.
Fig. 15, a view showing a modified form of discharge. Figs.
Figure 14:
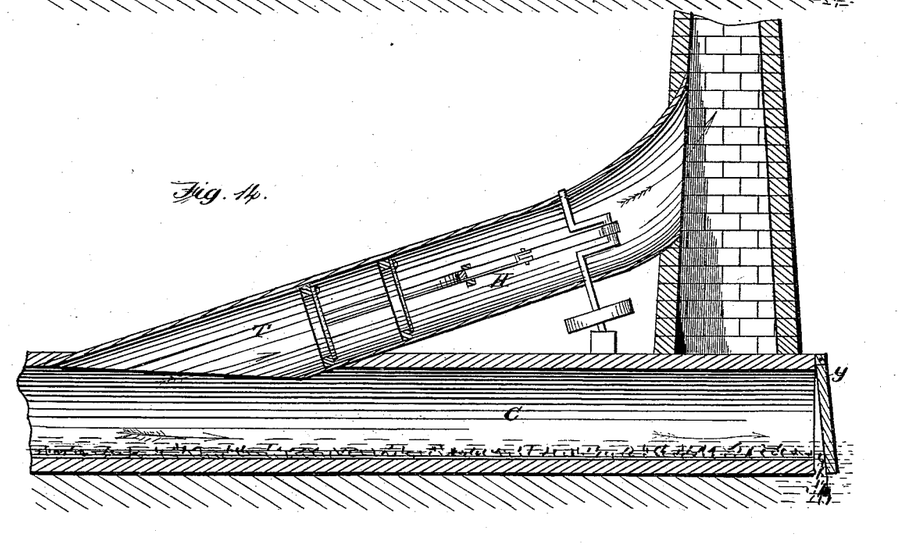

H, Fig. 1, represents a suction apparatus located at or near the discharge end of the sewer, and adapted to create a powerful suction or draft in the sewer toward its said discharge end. This suction apparatus may consist of one or more powerful suction-fans, as shown in Figs. 1, 3, 4, 5, 8, 9, 10, and 15, or of an air-pumping engine, as shown in Fig. 14, or of an air-exhausting screw, as shown in Fig. 13, its construction not being material, so long as it is competent to produce a powerful draft in the sewer. We by preference provide two independent suction apparatuses—one for active operation and the other for reserve in case of accident, or for stoppage from any cause of the other.

Figure 2:
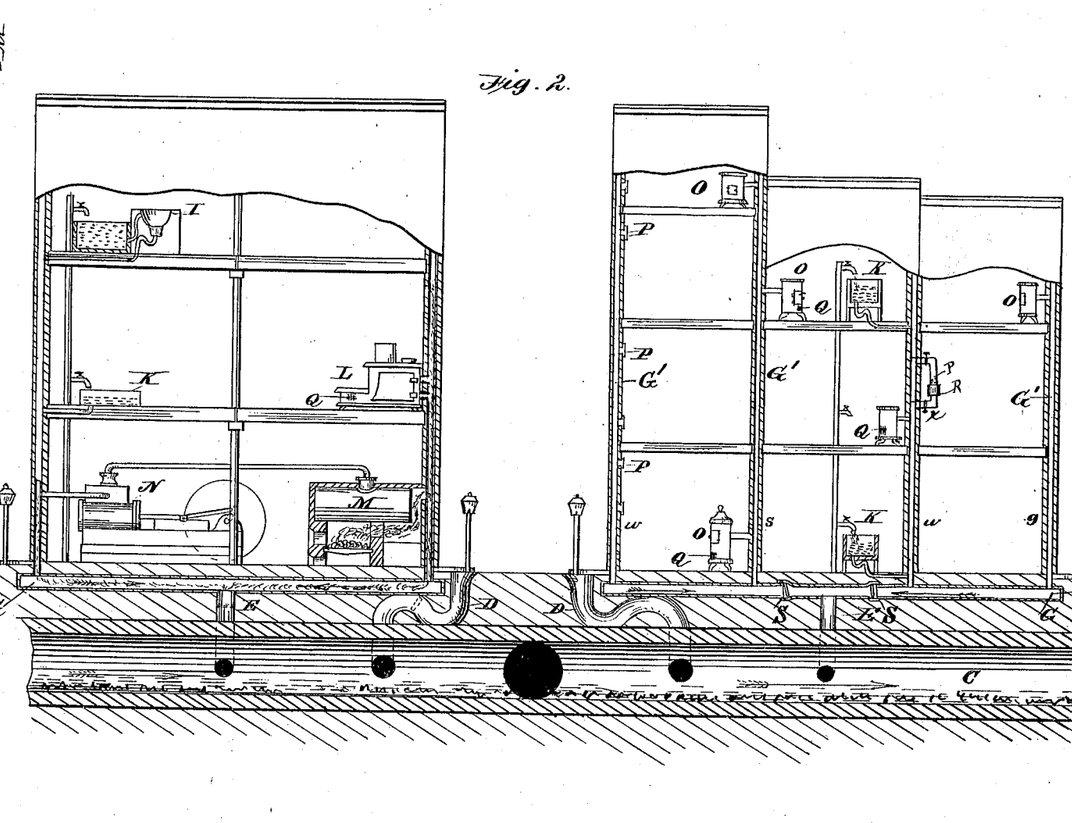
Fig. 2 is a vertical sectional view of a portion of a city, showing the workings of our improved system.

In Fig. 2 is shown at I a water-closet, at K a sink, at L a range, at M a steam-boiler furnace, at N a steam-exhaust, and at O a heating-stove, all discharging into the pipes G, leading to the sewer. In the cases of the sink and the water-closet all odors and noxious gases are, by the suction, conveyed away to the main. In the cases of the furnace, stove, and range the requisite draft is created, and the products of combustion, smoke, soot, gas, &c., are likewise utilized and conveyed away, while in the case of the steam-engine the condensed steam is carried off and the exhaust facilitated.

Figure 6:
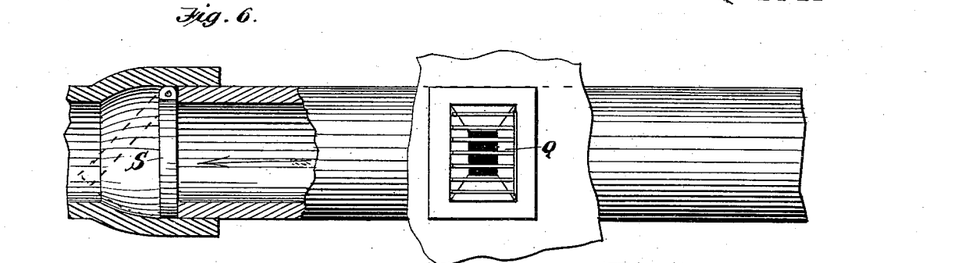
Figs. 6 and 7 show enlarged sectional views of inflow-pipes for conveying air from rooms into mains or branches, with check-valves therein for preventing back flow of current into the apartments or other places ventilated, and devices for regulating and controlling the discharge through the inflow-pipes.
Figure 7:
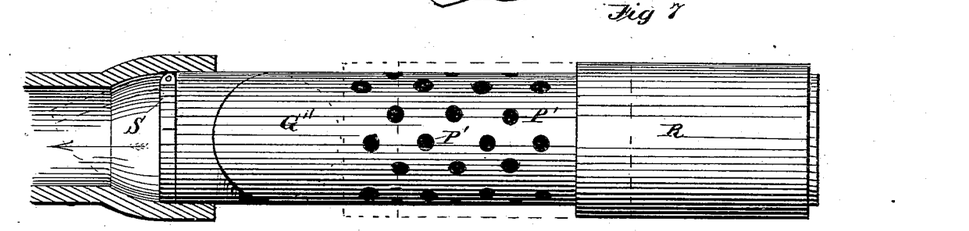
Figures 10, 11, 12:
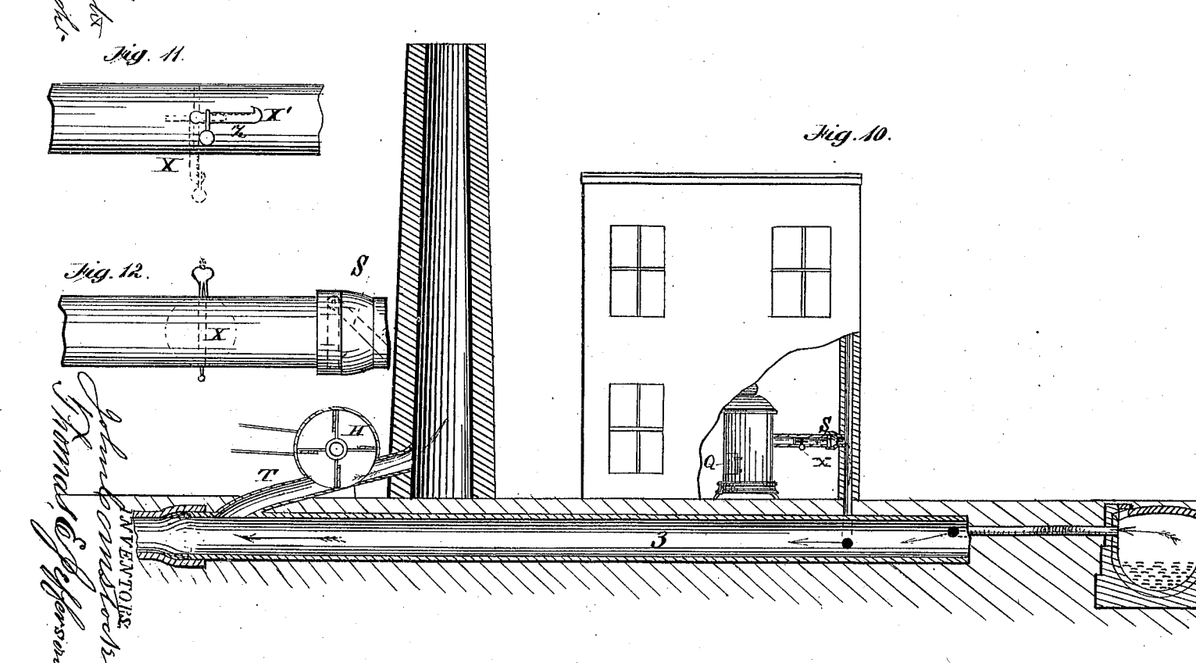
Fig. 10 is a view showing an arrangement in which the suction in the mains is employed to withdraw the gases from a cesspool, and also to create a draft for a stove in a dwelling, and in which the withdrawn gases, &c., are discharged up through a chimney.
Figs. 11 and 12 represent different devices for regulating the suction-draft to a stove or other connection to the mains.

P represents ventilating-openings in the several apartments of the building represented in Fig. 2, each leading into one of the exit-pipes G, and each preferably provided with a suitable valve for controlling the size of the opening—such, for instance, as shown in Fig. 6—consisting of an ordinary slatted valve or damper, Q, or, as shown in Fig. 7, consisting of a slide, R, adapted to slide upon the pipe G' and to cover more or less of the openings or perforations P' therein, or, as shown in Figs. 11 and 12, consisting of a valve or damper, X, mounted upon a spring-pivot adapted to keep it normally closed, and having attached to said pivot a graduated arm, X', provided with an adjustable weight, Z, by which the position of the valve or damper can be regulated.

Interposed at any suitable point or points between each house or place to be ventilated and the sewer or main are one or more suitable check-valves, S, which are adapted to readily close if from any cause there should be a back flow of current from the sewer, and thereby prevent any escape into the house or other place.

The check-valves, when arranged in the house pipes or branches, between the apartments or furnaces and the sewer or other conduit, are lettered upon the drawings S, and when in the sewer they are lettered W.

In Fig. 1, 3 represents the auxiliary main or conduit, which has direct connections with the house and apartments, the sewer C being arranged to accommodate the sewage and the products of combustion arising from the consumption of fuel. Upon the same shaft, 5, upon which the fan H is hung, is secured the fan 4, which operates in the auxiliary conduit 3 simultaneously with the fan H, both fans being impelled by the single motor H'. By this construction the sewer-gas is enabled to be purified by the carbonic products of combustion, and the only connection between the sewer and buildings may be through the furnaces or other heating apparatus, &c., while the ventilation of the apartments may be carried on through a separate conduit having no connection with the sewer, although the draft of each is induced by the same motor.

At the discharge end of the sewer, or at its discharge ends, if there be more than one, we preferably arrange an outwardly-opening valve or hood, Y, constructed so as to rise and fall with the tide and to permit the ready discharge of the liquid contents of the sewer, but prevent the inward passage of any external air.

Figure 3:
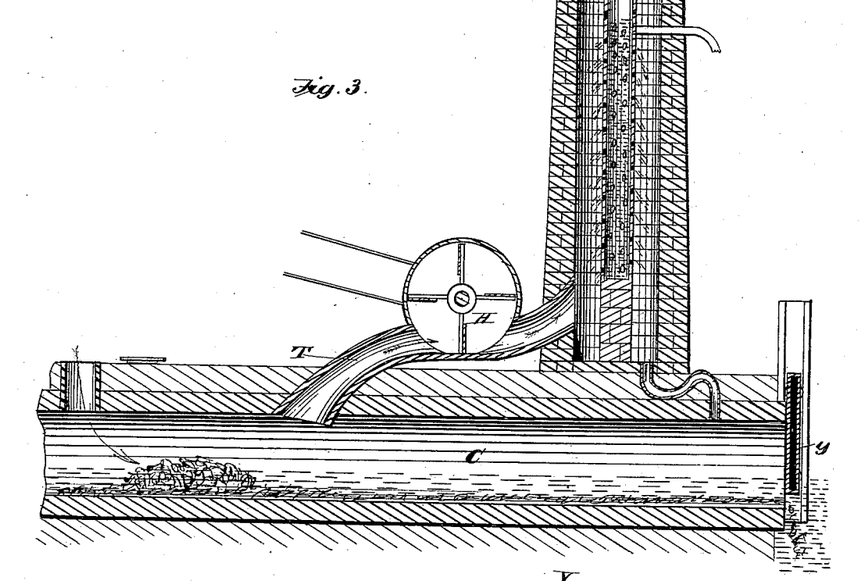
Figs. 3 and 4 show particularly the means for creating the suction in the mains and for washing the gases withdrawn therefrom, and also the means for removing obstructions in sewers.
Figure 4:
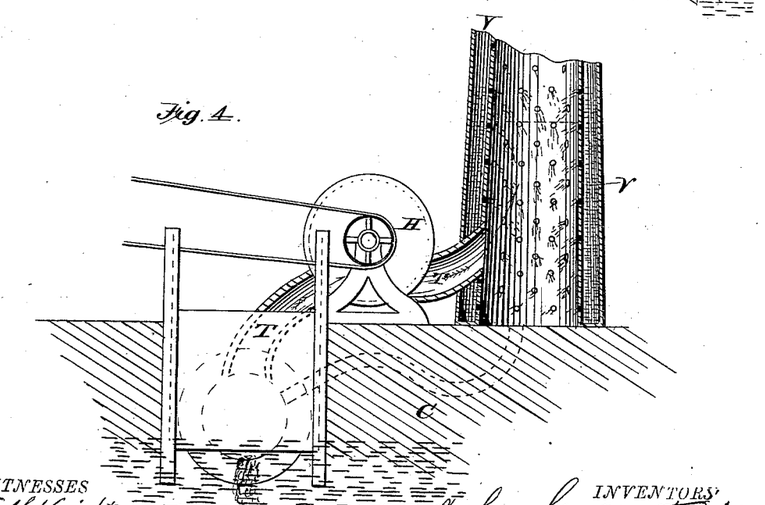
Figure 5:
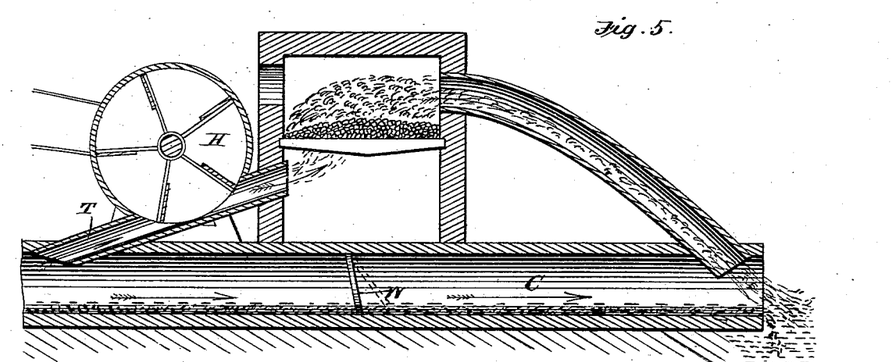
Fig. 5 is a view showing an arrangement in which the withdrawn gases are burned or decomposed by being passed through a furnace.
Figure 8:
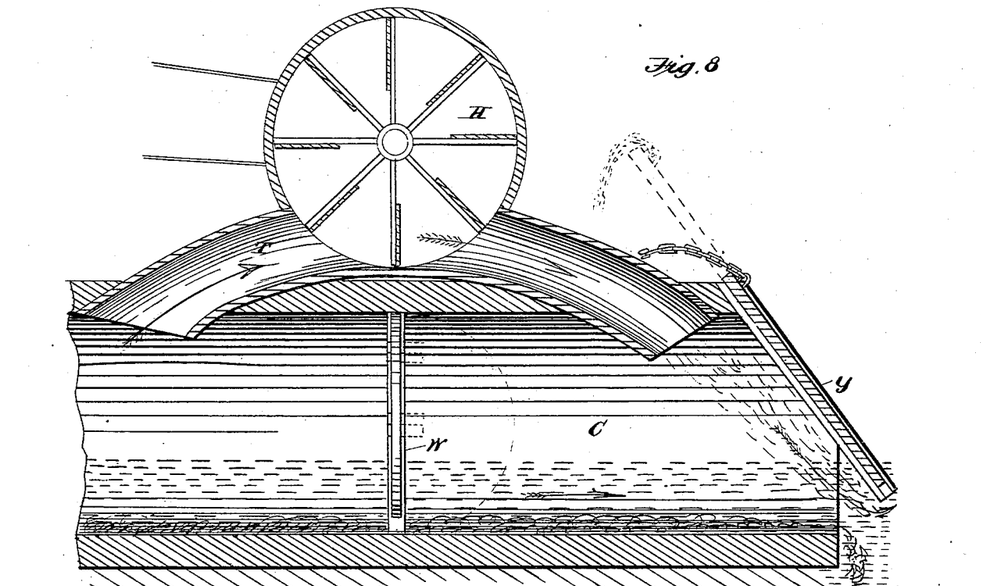
Figs. 8 and 9 are respectively a longitudinal section and a cross-section of a suction apparatus in connection with the gate or hood for preventing the back flow of air.
Figure 9:
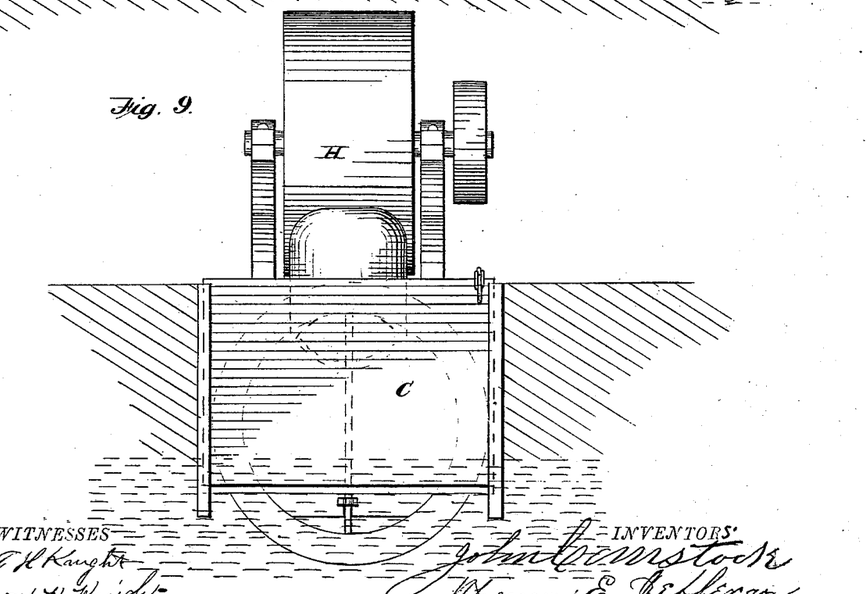

The trunk or pipe T, leading to the suction-apparatus, opens into the upper part of the sewer, some distance from the discharge end of the latter, as shown in Figs. 3, 8, and elsewhere, and the exhausted air, gas, &c., after passing the suction apparatus, is forced back again into the sewer and out through the water at the discharge-opening, as represented in Fig. 8, or up a tall chimney, as shown in Fig. 10, or through a furnace and out at the discharge end of the sewer, as in Fig. 5, or up through a spray of water sprayed outward from a pipe, U, in a chimney, as shown in Fig. 3, or through a spray of water sprayed inward from a water-jacket, V, as shown in Fig. 4, or through any other suitable gas-washer, or into the open air, as may be preferred.

The gate or valve at the discharge end of the sewer is represented in Fig. 4 as having friction-rollers, and as being adapted to slide in vertical guides, while in Fig. 8 it is represented as sliding in inclined guides.

Where the draft in the sewer is produced by a suction apparatus which draws the air, &c., from the sewer, and which forces it back again into the same at the point of discharge, it may be necessary to the creation of the proper draft to interpose an automatically-opening valve, W, between the point where the air, &c., is taken from the sewer and the point where it is discharged into it again, as shown in Fig. 8; but where the discharge from the suction-apparatus is not back into the sewer, but into the open air or elsewhere, this additional valve may not be necessary.

If the sewer is of great length, one or more suction apparatuses may be caused to draw out the air, &c., on one side of a check-valve interposed in it, and then discharge it again into the sewer on the other side of said valve, thus reducing, in a measure, the work of the main suction apparatus at the end of the sewer; and where there are several sets of mains or sewers they may all, or as many as practicable, be connected together, so as to render the employment of but one suction apparatus necessary.

In Fig. 15 the discharge of the air, &c., from the suction apparatus is effected through a pipe, $Z'$, having upon its end a sliding section or hollow float, $Z^2$, the lower end of which is maintained at all times slightly below the surface of the water by means of a counter-weight, $Z^3$, which rises and falls with the rise and fall of the tide.

In Fig. 1 we have shown an independent system of mains, 3, disconnected from the mains, and having its own separate suction apparatus, 4, as shown. These mains 3 are designed for the carrying out of our system of general ventilation where for any reason it is not practicable or desirable to use the sewer-mains. In some instances it may be desirable to utilize the sewers in carrying out our method of ventilation, and in others special conduits disconnected from the sewers may be desirable, and we therefore do not desire to be understood as limiting ourselves to either plan or arrangement.

The great effect of steady air-currents passing over the surface of bodies of water is often evidenced by the backing up of the waters in rivers and bays, when there is an upstream wind in the one case and a wind blowing into the harbor in the other. Now, this power of air-currents to move bodies of water we make use of in our system of ventilation, for by creating a powerful draft through the mains toward the discharge end or ends thereof the entire contents of the mains and their branches, both gaseous and liquid, are forcibly impelled onward to the point of discharge, and the capacity of the mains may thereby be doubled, if not in larger measure increased. Inasmuch as the pressure within the mains is greater, for obvious reasons, as the discharge end thereof is approached, the traps for the inlet of sewage are preferably graded, or, in other words, constructed so as to resist a greater or less amount of pressure, according to their location.

Figure 16:
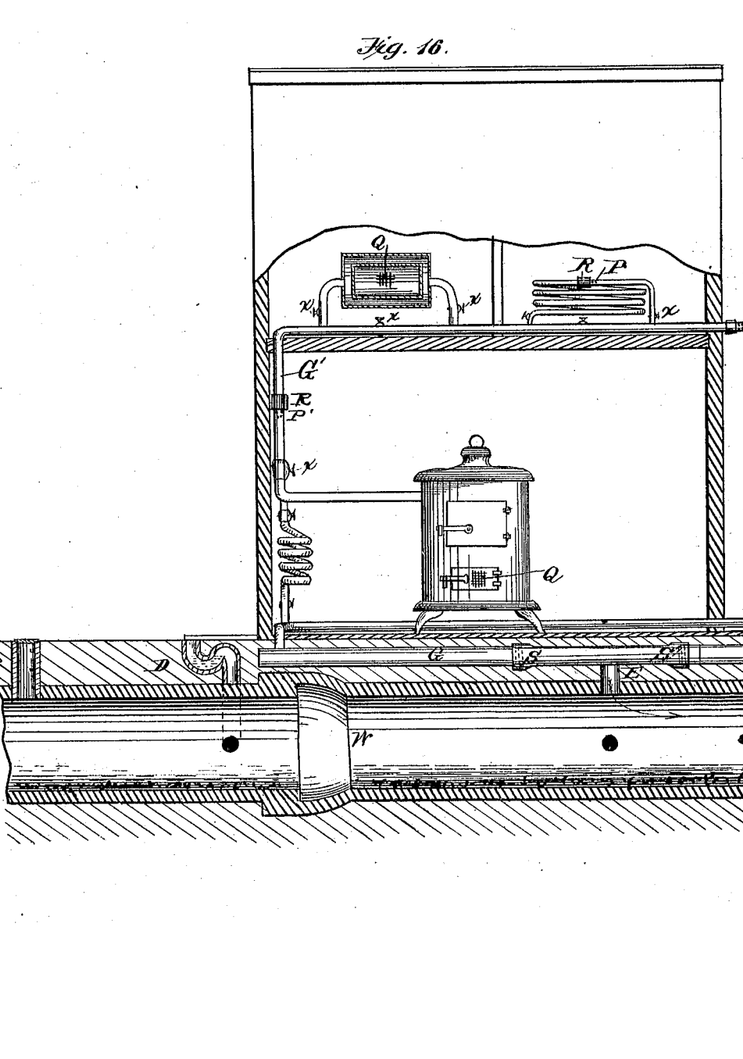
Figure 17:
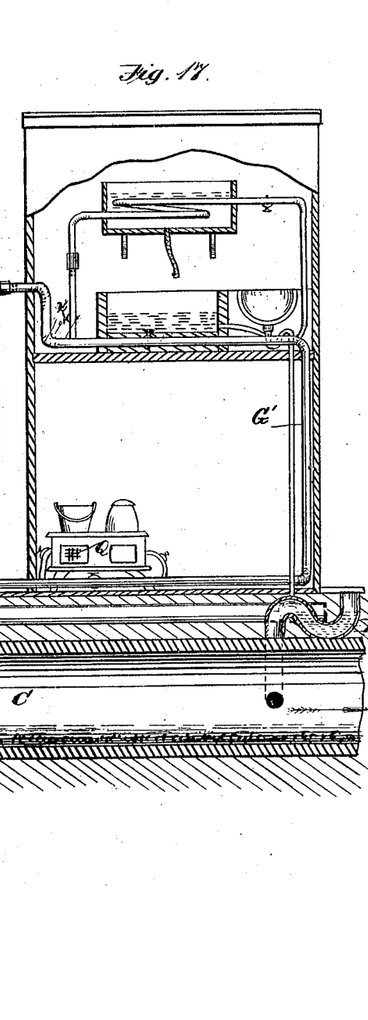
Figures 18, 19, 20:
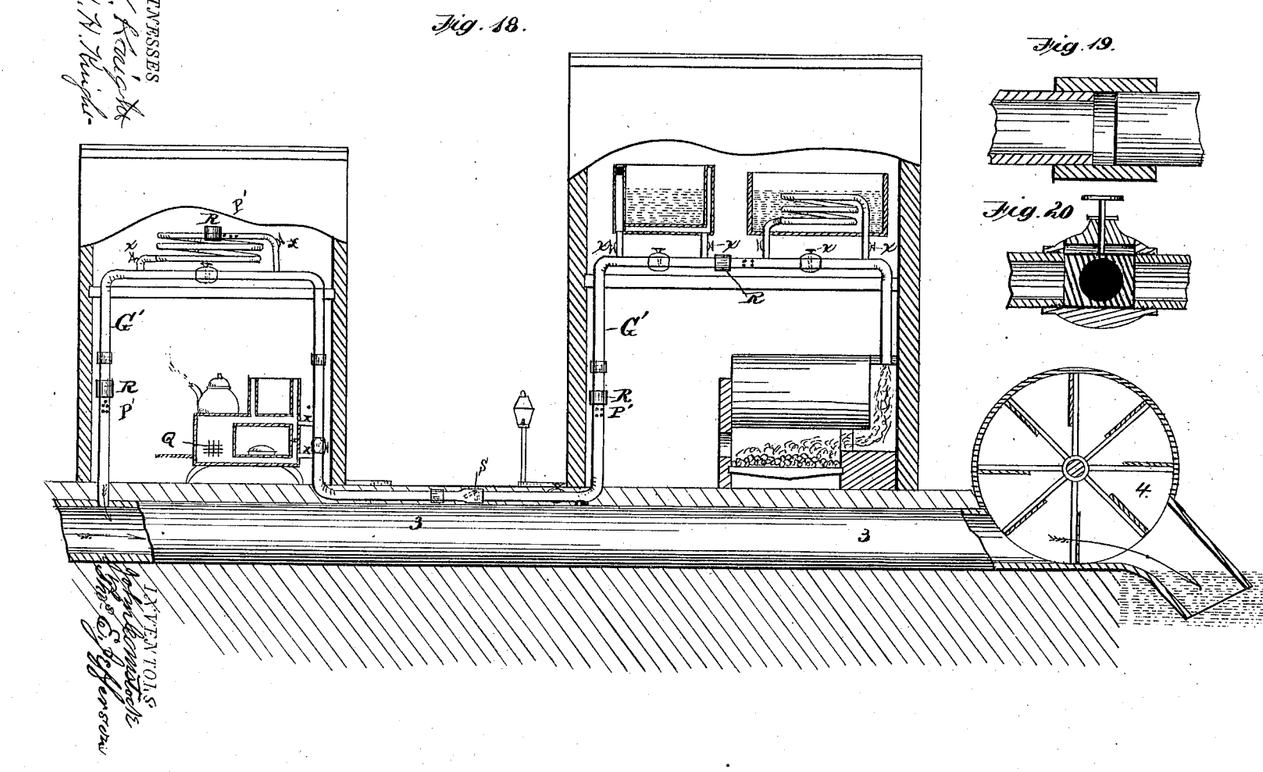
Fig. 18 shows a conductor and blower and pipes connecting the same with a furnace, said pipes leading through different apartments, different buildings, and different devices—such as ovens, water-tanks, stoves, heaters, &c.—in each, and being carried from one building to the other, a proper expansible joint allowing for contraction and expansion.
Figs. 19 and 20 are sectional views illustrating such expansible joint and a regulating-valve.

In Figs. 16 and 17 are shown several devices—such as radiating pipes, coils, drums, other stoves, &c.—connected by a pipe common to all and arranged between the furnace and the sewer. In our method of ventilation one or more of these devices have registers or other similar gaging device, by means of which the amount of ventilation through such a coil, drum, or the like may be readily controlled and the degree of heat modified at will. This may be necessary for the preservation of the mains sufficiently tight to render it possible to create the requisite draft by the formation of a partial vacuum.

Various modifications in details of construction may be made without departing from the principle or sacrificing the advantages of our invention, the essential features of which will be readily understood from the foregoing description, taken in connection with the accompanying drawings. For instance, we do not confine ourselves to either the sewer-main or any other particular main or conductor, as any conductor in which may be incited our continuous and powerful draft, and which will gather the vitiated air, smoke, &c., and convey them to a remote point, is claimed to be equivalent means, whether it be located above or below ground. The draft-inciting means and its motor may be of any number, kind, or construction which will subserve the purposes described, and its location in the conductor, or in relation thereto, may be arranged with a view of obtaining the best results. The seals or traps may be provided with proper check-valves, and such devices may be located at such proper distances apart in the conductor or its branches as may be desired. The means for regulating the amount or intensity of the draft may be of any construction which will afford the most ready and reliable adjustment, and the final disposition of the gas, &c., by burning, washing, or free discharge, may be arranged to suit.

It will be understood that by the expression "approximately air-tight sewers," employed herein, is meant a sewer having the usual manholes and street and other connections, but air-tight to the extent necessary to carry out the objects set forth. This feature we deem important, if not indispensable, serving, as it does, to give the places to be ventilated the benefit of the entire ventilating strength of the air-current, and allowing the dilution of the generating sewer-gas at will. The longer the sewer of a given size in diameter the nearer it should approximate an air-tight condition, in order that the suction apparatus may induce the partial vacuum and consequent current throughout the entire length of the sewer, wherever ventilation is desired or gas exists.

If the man-holes or other openings or inlets of an ordinary sewer were allowed to admit sufficient air to replace that which had been displaced by the fan, and to fill the partial vacuum caused by said fan or other pumping device, the means for ventilation herein described would be useless and inoperative. Hence the necessity of not only making the sewers approximate an air-tight condition, but also of exercising a reasonable care in constructing the seals and traps of sufficient strength to resist the inward atmospheric pressure due to the partial vacuum within. When properly constructed according to our invention the sewer may have ventilating-connections at such points throughout its length as may be desired, and the dilution and treatment of the sewer-gas be effected as and where it may be required. With this construction the suction apparatus will effect the strongest vacuum in its immediate vicinity, and hence the stronger seals will be indicated in that locality, while the series of seals may be gradually decreased in strength in the same ratio as their proximity to the fan or suction device will suggest.

The sewer should be made to approximate an air-tight condition in the same ratio that the length and capacity of the sewer and the power of the suction apparatus upon its contents will suggest, the object of this portion of the invention being to have the sewer so far approach an air-tight condition that the fan will effect a partial vacuum in its most remote places, or wherever it is desired to ventilate, and for this purpose the ordinary sewer, as used with its open man-holes and other air-inlets or misapplied seals, we find to be objectionable. The fan being impelled by a steam-engine or other power, the rate of speed is readily adjusted to suit the service to be performed—as, for instance, in warm weather, when much ventilation is required, a higher rate of speed is necessary, while in winter the ventilation through the furnaces may be sufficient in some cases, and a less speed be indicated. This adjustment of the fan force also accommodates the more or less air-tight condition of the sewer, and this force may be adjusted to suit sewers of different capacities and lengths.

The degree of fan speed required may be readily ascertained from the condition of the draft in places most remote from the fan and power. It will also be observed that where it is necessary to ventilate the sewer alone a comparatively slow rate of speed will be sufficient to eliminate the gases. In some places and under some circumstances—such as in large cities and long sewers—it may be necessary to employ more than one fan or suction apparatus, and we provide for such contingency by dividing the sewer into sections, each section having a fan and engine, the fan working under greatest force being at the sewer-outlet and adapted to take all the gas, &c., from the next succeeding fan, and have a surplus of power to create a vacuum between it and said next succeeding fan to effect the proper ventilation in that section, and so on, the fans being used collectively and decreasing in force from the sewer-outlet back.

In very large cities even this system of ventilation may not be sufficient, and in such contingency the sewer system may be segregated, each section having all the elements of this invention—that is, sewer, fan, check-valves, ventilating-connections, and exit, as seen in Fig. 10.

The features of our invention relating to the construction of the sewer we will make the subject of a separate application.

It will be understood that the air displaced from the ventilated places by the suction apparatus may be replaced by fresh air in any well-known method and by any desirable means, and that any proper motor and suction means may be employed.

The system of utilizing heat and the construction of sewers, as mentioned and illustrated, will be made the subject of a separate application.

Having thus described our invention, we claim as new—

1. In the art of ventilation, the method of utilizing the sewers of a city as main ventilating-conduits, whereby the discharge of the sewage is accelerated and the sewers rendered more efficient in their action, which consists in connecting the sewers by suitable branches to the buildings to be ventilated, inducing a powerful mechanically-produced draft toward the exits of the sewers, and automatically preventing the back flow of air-currents into the sewers and drains, substantially as set forth.

2. In ventilating the sewers of a city or district and the drains of a building or buildings, the method of utilizing the products of combustion of furnaces, stoves, &c., as an aid to the purification of the gases within the sewer and drains previous to their elimination from the same, which consists in connecting the flues of the heating apparatus to said drains and sewers and inducing a powerful mechanically-produced draft of air within said sewer, &c., whereby the said products of combustion are commingled with the noxious gases and vapors, and are finally discharged at a point beyond the inhabited portions of the city or district, as set forth.

3. In ventilating the sewers of a city or district and the drains of buildings, the method of utilizing the surplus heat of the furnaces or other heating apparatus of the buildings located within a defined district to prevent the sewer contents from freezing, and thus interfering with effective ventilation, which consists in connecting the heating apparatus with the sewers, mechanically inducing a powerful draft of air toward the exits of the sewers, and regulating the discharge from the heating apparatus to the sewers, as set forth.

4. In the art of ventilation, the combination, with a conduit rendered approximately air-tight, and means for inciting therein a powerful and continuous draft in the direction of its exit, of branches connecting said conduit with the apartments of buildings, and means whereby the back flow of sewer-gas from said conduit is automatically provided against, substantially as set forth.

5. The combination, with a conduit having suitable connections with apartments of buildings, and means for inducing a draft of air therein in the direction of its outlet, of check-valves or gates arranged at proper points in the conduit and connections, and adapted to automatically prevent the back flow of impure air into said apartments when the draft-inciting means are not in operation, or from other cause, as set forth.

6. The combination, with a suitable conduit and the draft-inducing means, of connections between apartments and said conduit, and devices within said connections, whereby the back flow of impure gas is automatically prevented, as set forth.

7. The combination, with an approximately air-tight sewer having inlets from the places to be ventilated, of the means for inducing a powerful draft of air toward the exit of the sewer, and means applied to the sewer whereby air-currents in the opposite direction are automatically prevented, as set forth.

8. The combination of the house-drains G, having check-valves S, with the main conduit, the fan H, and hood Y, as and for the purposes set forth.

9. The combination of the house-drains G, having check-valves S, and the main conduit C, having check-valves W, with the fan H and the hood Y, as set forth, for the purposes specified.

10. The combination, with the main conduit, having check-valves W, and hood or gate Y, of the fan H, the connections between the main conduit and the heating apparatus, and the means X for regulating the escape of the products of combustion from the latter to the main conduit, as set forth.

11. The combination, with the main conduit, having check-valves W, and hood or gate Y, of the fan H, the connections between the main conduit and the appartments, and heating apparatus, of the dampers X and ventilators R for regulating the draft and ventilation, as set forth.

12. The combination, with the main conduit, the fan H, and hood Y, of the connections between the main conduit and the apartments to be ventilated, and means for controlling the draft and air-currents within the main conduit, and within the connections between the apartments and the conduit, as set forth.

13. In the art of ventilation, the combination of the heating apparatus of buildings, the main ventilating-conduit, the fan H, and hood Y with connections between the said heating apparatus and the main conduit, valves within the connections, and regulators attached to the heating apparatus, whereby the impure air is conducted into the heating apparatus, from thence into the sewer, and finally discharged into the open air at a point away from the inhabitants of a city, substantially in the manner and for the purposes set forth.

14. The combination, with the main conduit, the means for inducing a powerful draft therein toward its exit, and a hood, Y, of a supplemental valve located near the exit of the main conduit, between the hood or gate Y and fan, as set forth.

15. The combination of the main conduit and means for producing a powerful draft therein with the valve at or near the outlet of said conduit, adapted to slide up and down in guides, and provided with means for adjusting it, as set forth.

16. The combination, with two main ventilating-conduits, each provided with air-exhausting means at or near its exit, of a single motor arranged to impart motion to both exhausters, as set forth.

17. In the art of ventilation, a sewer-main having ventilating-connections through furnaces, stoves, &c., and an auxiliary main having ventilating-connections with apartments and buildings, combined with means for creating a powerful draft in each main in the direction of its outlet, and a motor common to both of said draft-inciting means, as set forth.

18. In the art of ventilation, a sewer and an adjacent main, the former having connections with stoves, furnaces, &c., the latter with ventilating-connections with apartments, buildings, &c., and both having means for preventing back flow and means for regulating amount of ventilation, combined with draft-inducing means for each main, operated simultaneously by a single motor, as specified.

19. The combination of the sewer C, having check-valves W and connections with heating apparatus, the auxiliary conduit 3, having check-valves and connections with apartments, and regulating means, with the suction-fans H 4, hung upon the same shaft, 5, and operated by a single motor, H', as and for the purposes set forth.

In testimony whereof we affix our signatures in presence of two witnesses.

JOHN COMSTOCK.
THOMAS E. JEFFERSON.

Witnesses:
H. CLAY SMITH,
H. J. ENNIS.